(12) United States Patent
Yang

(10) Patent No.: US 11,671,137 B2
(45) Date of Patent: Jun. 6, 2023

(54) ELECTRONIC DEVICE AND METHOD FOR IDENTIFYING COMPONENTS CORRESPONDING TO DESIGNATED FREQUENCY BAND INCLUDED IN TRANSMISSION SIGNAL

(71) Applicant: Samsung Electronics Co., Ltd., Suwon-si (KR)

(72) Inventor: Ihnsik Yang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 112 days.

(21) Appl. No.: 17/272,256

(22) PCT Filed: Aug. 20, 2019

(86) PCT No.: PCT/KR2019/010557
§ 371 (c)(1),
(2) Date: Feb. 26, 2021

(87) PCT Pub. No.: WO2020/045876
PCT Pub. Date: Mar. 5, 2020

(65) Prior Publication Data
US 2021/0314017 A1   Oct. 7, 2021

(30) Foreign Application Priority Data
Aug. 28, 2018 (KR) .................. 10-2018-0101463

(51) Int. Cl.
*H04B 1/44* (2006.01)
*H04B 17/11* (2015.01)
(Continued)

(52) U.S. Cl.
CPC .............. *H04B 1/44* (2013.01); *H04B 1/006* (2013.01); *H04B 1/04* (2013.01); *H04B 17/11* (2015.01);
(Continued)

(58) Field of Classification Search
CPC .......... H04B 1/04; H04B 1/005; H04B 1/006; H04B 1/40; H04B 1/44; H04B 17/11;
(Continued)

(56) References Cited

U.S. PATENT DOCUMENTS 6,408,193 B1 * 6/2002 Katagishi ................. H04B 1/52
455/115.3
6,957,080 B2 * 10/2005 Guetre ................... H01Q 1/243
455/552.1
(Continued)

FOREIGN PATENT DOCUMENTS

KR   10-1998-0036984 A   8/1998
KR   10-2006-0088956 A   8/2006
(Continued)

OTHER PUBLICATIONS

International Search Report dated Nov. 28, 2019 in connection with International Patent Application No. PCT/KR2019/010557, 2 pages.
(Continued)

*Primary Examiner* — Quochien B Vuong

(57) ABSTRACT

Various embodiments relate to an electronic device and a method for preventing interference between signals transmitted and received through first and second antennas. To this end, an electronic device according to various embodiments comprises, a first antenna and a second antenna, a battery, a wireless communication module having a coupler, and a processor electrically connected to the first antenna and second antennas, the battery, and the wireless communication module, wherein the processor can be configured to, measure, on the basis of a first signal transmitted and received through the first antenna, the magnitude of components, corresponding to a designated frequency band, of a coupling signal fed back from the coupler, compare the measured magnitude with a designated threshold value, and control at least some elements of the electronic device such (Continued)

that the measured magnitude is reduced to be less than or equal to the designated threshold value when the measured magnitude exceeds the designated threshold value. Other embodiments can also be possible.

15 Claims, 11 Drawing Sheets

(51) Int. Cl.
*H04B 1/04* (2006.01)
*H04B 17/15* (2015.01)
*H04B 1/00* (2006.01)

(52) U.S. Cl.
CPC ..... *H04B 17/15* (2015.01); *H04B 2001/0416* (2013.01)

(58) Field of Classification Search
CPC ........ H04B 17/15; H04B 17/21; H04B 17/24; H04B 17/29
See application file for complete search history.

(56) References Cited

U.S. PATENT DOCUMENTS

| | | | | |
|---|---|---|---|---|
| 8,546,980 | B2* | 10/2013 | Shimamoto | H04B 1/006 |
| | | | | 307/109 |
| 8,780,745 | B2* | 7/2014 | Mueck | H04B 17/24 |
| | | | | 370/252 |
| 10,069,576 | B2* | 9/2018 | Lee | H04B 1/44 |
| 2012/0088510 | A1 | 4/2012 | Akhi et al. | |
| 2012/0099624 | A1 | 4/2012 | Nagaya et al. | |

FOREIGN PATENT DOCUMENTS

| | | |
|---|---|---|
| KR | 10-2008-0000925 U | 5/2008 |
| KR | 10-1189286 B1 | 10/2012 |
| KR | 10-2014-0012496 A | 2/2014 |
| KR | 10-2016-0059996 A | 5/2016 |

OTHER PUBLICATIONS

Written Opinion of the International Searching Authority dated Nov. 28, 2019 in connection with International Patent Application No. PCT/KR2019/010557, 4 pages.

* cited by examiner

| FDD LTE BANDS & FREQUENCIES | | | | | |
|---|---|---|---|---|---|
| LTE BAND NUMBER | UPLINK (MHZ) | DOWNLINK (MHZ) | WIDTH OF BAND (MHZ) | DUPLEX SPACING (MHZ) | BAND GAP (MHZ) |
| 1 | 1920 - 1980 | 2110 - 2170 | 60 | 190 | 130 |
| 2 | 1850 - 1910 | 1930 - 1990 | 60 | 80 | 20 |
| 3 | 1710 - 1785 | 1805 - 1880 | 75 | 95 | 20 |
| 4 | 1710 - 1755 | 2110 - 2155 | 45 | 400 | 355 |
| 5 | 824 - 849 | 869 - 894 | 25 | 45 | 20 |
| 6 | 830 - 840 | 875 - 885 | 10 | 35 | 25 |
| 7 | 2500 - 2570 | 2620 - 2690 | 70 | 120 | 50 |
| 8 | 880 - 915 | 925 - 960 | 35 | 45 | 10 |
| 9 | 1749.9 - 1784.9 | 1844.9 - 1879.9 | 35 | 95 | 60 |
| 10 | 1710 - 1770 | 2110 - 2170 | 60 | 400 | 340 |
| 11 | 1427.9 - 1452.9 | 1475.9 - 1500.9 | 20 | 48 | 28 |
| 12 | 698 - 716 | 728 - 746 | 18 | 30 | 12 |
| 13 | 777 - 787 | 746 - 756 | 10 | -31 | 41 | ~810
| 14 | 788 - 798 | 758 - 768 | 10 | -30 | 40 | ~820
| 15 | 1900 - 1920 | 2600 - 2620 | 20 | 700 | 680 |
| 16 | 2010 - 2025 | 2585 - 2600 | 15 | 575 | 560 |
| 17 | 704 - 716 | 734 - 746 | 12 | 30 | 18 |
| 18 | 815 - 830 | 860 - 875 | 15 | 45 | 30 |
| 19 | 830 - 845 | 875 - 890 | 15 | 45 | 30 |
| 20 | 832 - 862 | 791 - 821 | 30 | -41 | 71 |
| 21 | 1447.9 - 1462.9 | 1495.5 - 1510.9 | 15 | 48 | 33 |
| 22 | 3410 - 3500 | 3510 - 3600 | 90 | 100 | 10 |
| 23 | 2000 - 2020 | 2180 - 2200 | 20 | 180 | 160 |
| 24 | 1625.5 - 1660.5 | 1525 - 1559 | 34 | 101.5 | 135.5 |
| 25 | 1850 - 1915 | 1930 - 1995 | 65 | 80 | 15 |
| 26 | 814 - 849 | 859 - 894 | 30 / 40 | | 10 |
| 27 | 807 - 824 | 852 - 869 | 17 | 45 | 28 |
| 28 | 703 - 748 | 758 - 803 | 45 | 55 | 10 |
| 29 | n/a | 717 - 728 | 11 | | |
| 30 | 2305 - 2315 | 2350 - 2360 | 10 | 45 | 35 |
| 31 | 452.5 - 457.5 | 462.5 - 467.5 | 5 | 10 | 5 |

FIG.8

ELECTRONIC DEVICE AND METHOD FOR IDENTIFYING COMPONENTS CORRESPONDING TO DESIGNATED FREQUENCY BAND INCLUDED IN TRANSMISSION SIGNAL

CROSS-REFERENCE TO RELATED APPLICATIONS

This application is a 371 of International Application No. PCT/KR2019/010557 filed on Aug. 20, 2019, which claims priority to Korean Patent Application No. 10-2018-0101463 filed on Aug. 28, 2018 in the Korean Intellectual Property Office, the disclosures of which are herein incorporated by reference in their entirety.

BACKGROUND

1. Field

Various embodiments relate to an electronic device and method for identifying a component corresponding to a designated frequency band included in a transmission signal.

2. Description of the Related Art

Recently, electronic devices are providing more diversified services and additional functions. To meet users' various needs and raise use efficiency of electronic devices, communication service carriers or device manufacturers are jumping into competitions to develop various services with differentiated and diversified functionalities.

An electronic device may provide a plurality of communication services using a plurality of communication networks. For example, the electronic device may provide a voice call service and a data service through a circuit switching (CS) network, a packet switching (PS) network, or a long term evolution (LTE) network. Or, the electronic device may receive global positioning system (GPS) signals and provide various services based on a location.

SUMMARY

Frequencies used in communication networks for providing a plurality of communication services on an electronic device may overlap or be adjacent to a frequency used in another network. For example, in LTE, the transmission frequency of the 13th band is 777 MHz to 787 MHz, and the reception frequency is 746 MHz to 756 MHz. In LTE, the transmission frequency of the 14th band is 788 MHz to 798 MHz, and the reception frequency is 758 MHz to 768 MHz.

However, in LTE, the transmission frequency of the 13th band is 777 MHz to 787 MHz, and the transmission frequency of the 14th band is 788 MHz to 798 MHz. Further, the second harmonic frequencies for the 13th and 14th bands are 1554 MHz to 1574 MHz and 1576 MHz to 1596 MHz, respectively. As such, since the second harmonic frequencies of the 13th and 14th bands are adjacent to the 1575.42 MHz frequency of the GPS, the harmonic frequency component related to the LTE signal and the GPS signal may interfere with each other.

Further, the electronic device is equipped with a notch filter to reduce the second harmonic frequency component related to a transmission frequency based on the 13th band and the 14th band of LTE, but the performance by the notch filter is Each may differ from one electronic device to another, and this may cause a difference in GPS performance for each electronic device.

Various embodiments may avoid (or eliminate) interference between signals transmitted and received through a plurality of antennas provided in an electronic device.

According to various embodiments, an electronic device comprises a first antenna and a second antenna, a battery, a wireless communication module having a coupler, and a processor electrically connected with the first and second antennas, the battery, and the wireless communication module. The processor may be configured to measure a magnitude of a component corresponding to a designated frequency band of a coupling signal fed back from the coupler based on a first signal transmitted or received through the first antenna, compare the measured magnitude with a designated threshold, and control at least some elements of the electronic device to allow the measured magnitude to be reduced to the designated threshold or less if the measured magnitude exceeds the designated threshold.

According to various embodiments, a method for avoiding interference between signals transmitted or received through first and second antennas in an electronic device comprises measuring a magnitude of a component corresponding to a designated frequency band of a coupling signal fed back from a coupler based on a first signal transmitted or received through a first antenna, comparing the measured magnitude with a designated threshold, and controlling at least some elements of the electronic device to allow the measured magnitude to be reduced to the designated threshold or less if the measured magnitude exceeds the designated threshold.

According to various embodiments, there is provided a computer readable storage medium storing a program including instructions to enable an electronic device to identify a component corresponding to a designated frequency band included in a transmission signal, the instructions executed to enable at least one processor to measure a magnitude of a component corresponding to a designated frequency band of a coupling signal fed back from a coupler based on a first signal transmitted or received through a first antenna, compare the measured magnitude with a designated threshold, and control at least some elements of the electronic device to allow the measured magnitude to be reduced to the designated threshold or less if the measured magnitude exceeds the designated threshold.

The electronic device may identify a component corresponding to a designated frequency band included in a transmission signal transmitted through any one of a plurality of antennas provided in the electronic device.

Further, the electronic device reduces the second harmonic frequency component related to the frequency of the signal transmitted and received through any one of the plurality of antennas provided in the electronic device, thereby avoiding interference between the first signal transmitted or received through the first antenna and the second signal transmitted or received through the second antenna.

Further, the electronic device may avoid interference with the GPS frequency and enhance GPS performance by filtering the second harmonic frequency component related to the transmission frequencies of the 13th and 14th bands in LTE.

Further, the electronic device may avoid interference with the GPS signal received through the second antenna by increasing the current supplied to the power amplifier for signal amplification so as to reduce the magnitude of the second harmonic frequency component of the coupling signal fed back from the coupler based on the signal transmitted through the first antenna to the LTE network.

BRIEF DESCRIPTION OF THE DRAWINGS

FIG. 8 is a view illustrating an example table for LTE bands and frequencies of each band according to various embodiments;

DETAILED DESCRIPTION

Figure 1:
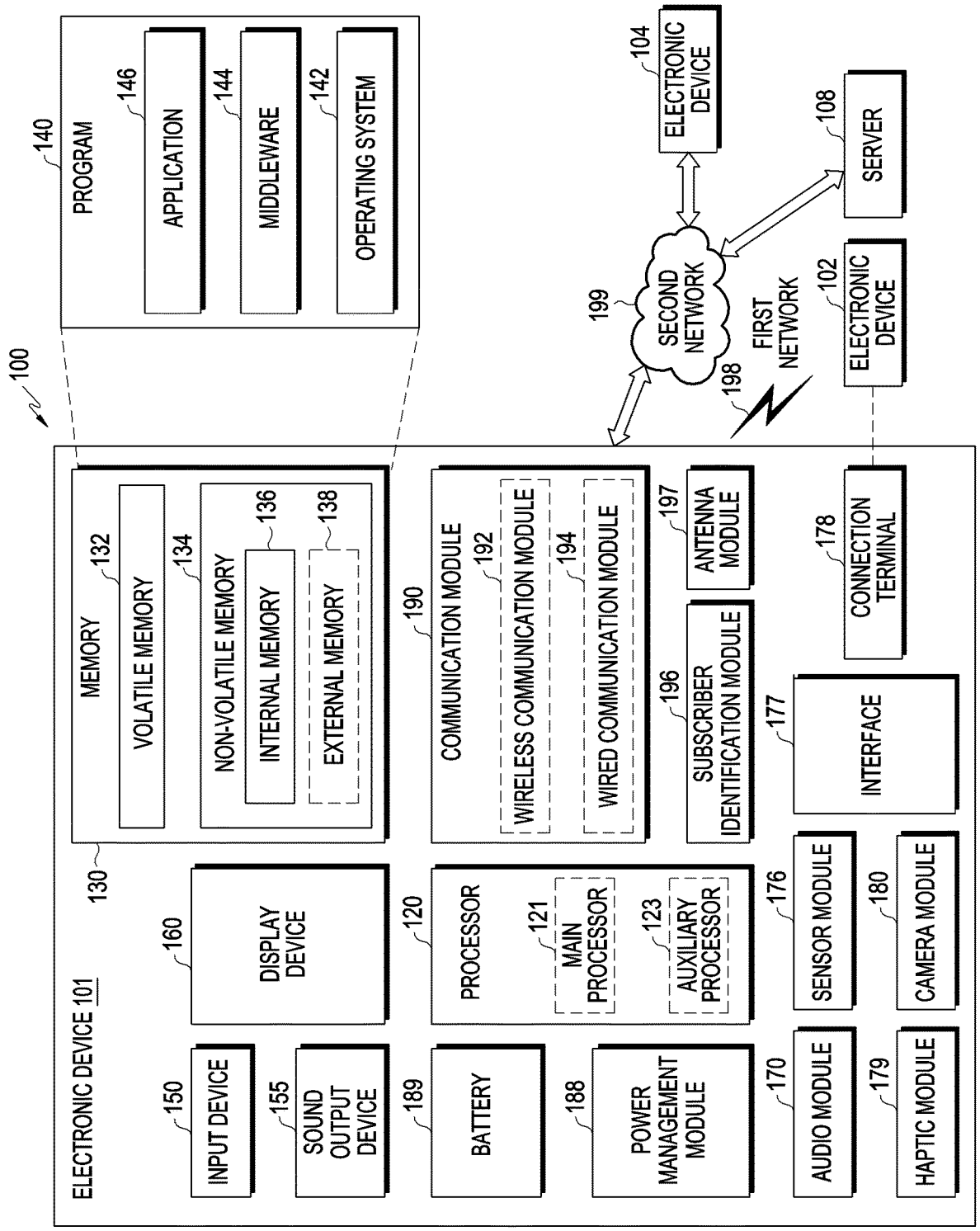
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
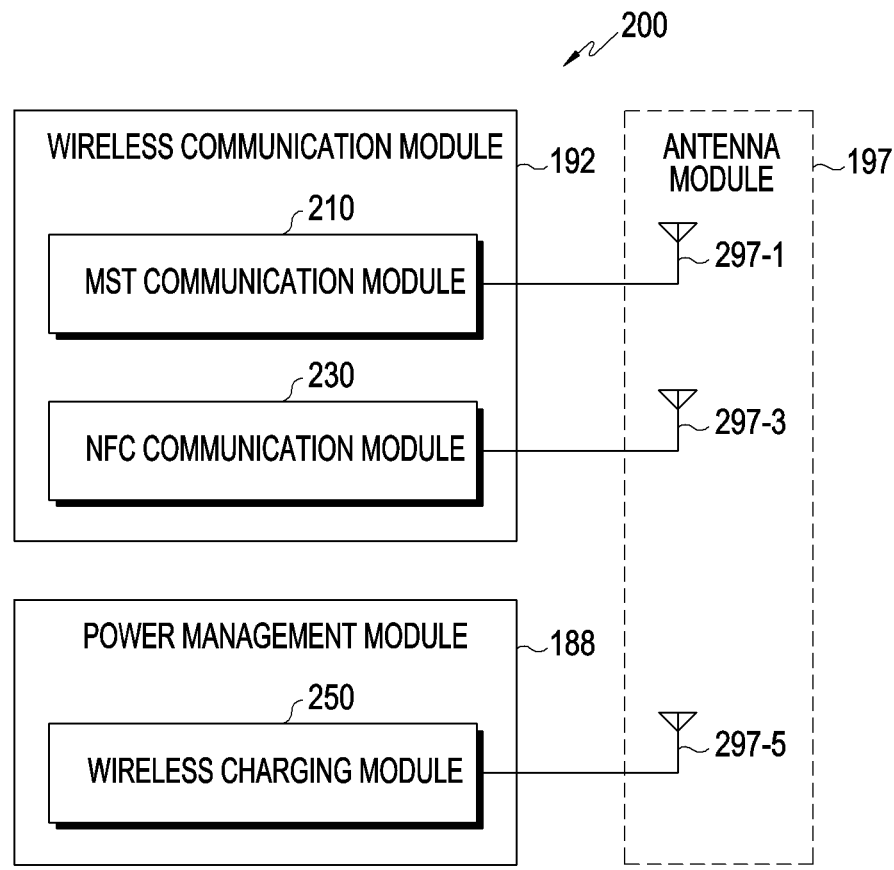
FIG. 2 is a block diagram illustrating a wireless communication module, power management module, and antenna module of an electronic device according to various embodiments.

FIG. 2 is a block diagram 200 illustrating the wireless communication module 192, the power management module 188, and the antenna module 197 of the electronic device 101 according to various embodiments.

Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include an MST antenna 297-1 connected with the MST communication module 210, an NFC antenna 297-3 connected with the NFC communication module 230, and a wireless charging antenna 297-5 connected with the wireless charging module 250. For ease of description, the same components as those described in regard to FIG. 1 are briefly described or omitted from the description.

According to various embodiments, the MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

According to various embodiments, the NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

According to various embodiments, the wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to various embodiments, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 297 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to various embodiments, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
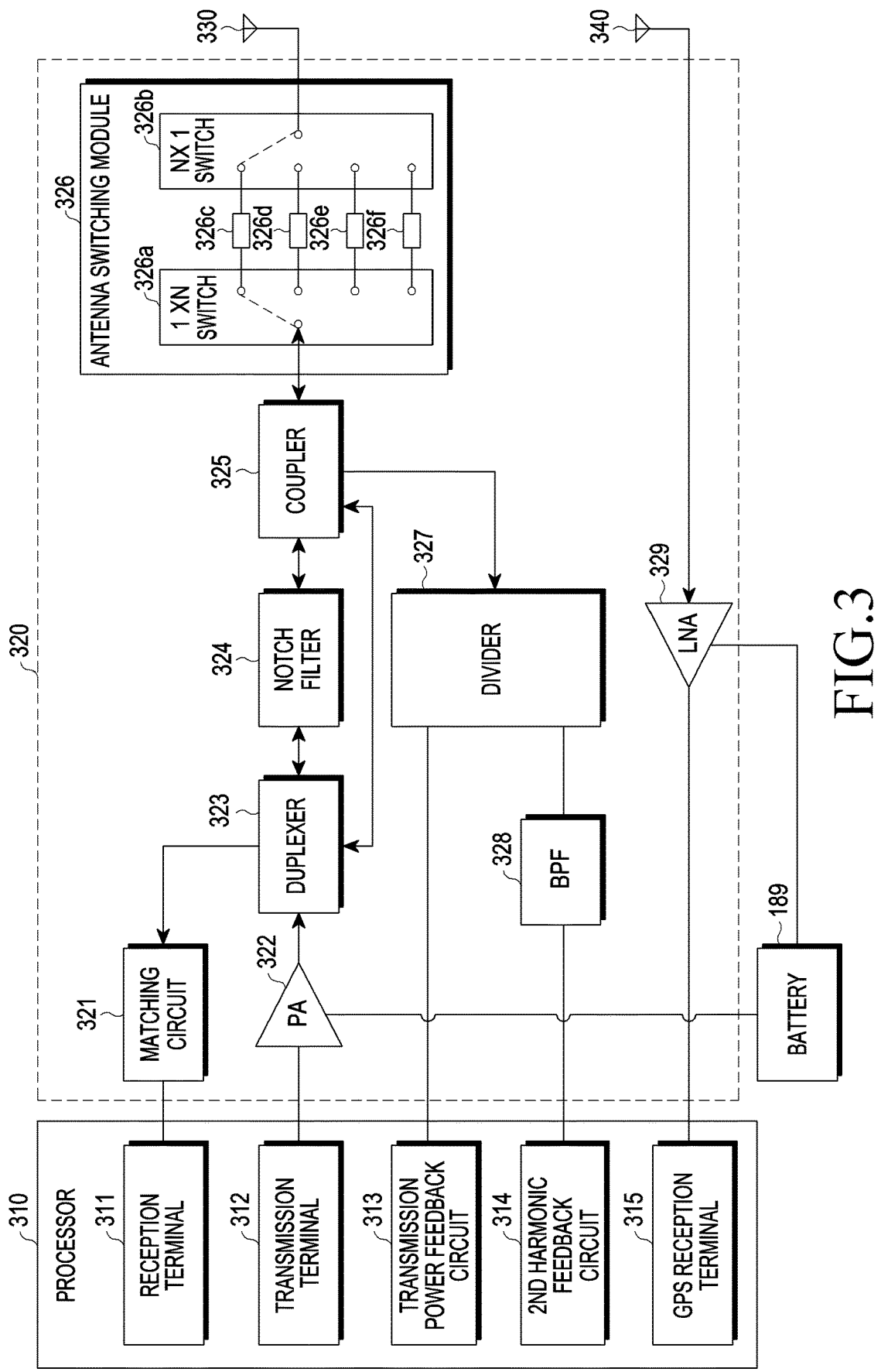
FIG. 3 is a block diagram illustrating an electronic device 101 for avoiding interference between signals transmitted and received through first and second antennas, according to various embodiments.

FIG. 3 is a block diagram illustrating an electronic device 101 for avoiding interference between signals transmitted and received through first and second antennas, according to various embodiments.

Referring to FIG. 3, an electronic device 101 according to various embodiments may include a processor 310 (e.g., the processor 120 of FIG. 1), a wireless communication module 320 (e.g., the wireless communication module 192 of FIG. 1), a first antenna 330, a second antenna 340, and a battery 189. The wireless communication module 320 (or communication circuit) may include a matching circuit 321, a power amplifier 322, a duplexer 323, a notch filter 324, a coupler 325, an antenna switching module 326, a divider 327, a band pass filter (BPF) 328, and a low noise amplifier (LNA) 329.

According to various embodiments, the power amplifier 322 may amplify a transmission signal output from a transmission terminal 312 of the processor 310 (e.g., the processor 120 of FIG. 1). The power amplifier 322 may receive and amplify the transmission signal from the processor 310 (e.g., the processor 120 of FIG. 1), and transmit the amplified transmission signal to the duplexer 323. The power amplifier 322 may be driven based on a bias voltage supplied from the battery 189 to thereby amplify the transmission signal and transmit the amplified transmission signal to the duplexer 323. Each of the power amplifier 322 and the duplexer 323 may operate differently according to frequency bands or communication schemes of the transmission signal. For example, the power amplifier 322 may include a multi-mode multi-band (MMMB) power amplifier. The duplexer 323 may include a high band (HB) duplexer, a middle band (MB) duplexer, or a low band (LB) duplexer.

According to various embodiments, the duplexer 323 may branch a transmission signal and a reception signal. The duplexer 323 may divide the transmission signal and the reception signal and perform filtering on each of the transmission frequency and the reception frequency. According to an embodiment, when a signal is transmitted through the first antenna 330, the duplexer 323 may receive the signal output from the power amplifier 322 and transfer the received signal to the notch filter 324 or the coupler 325. According to another embodiment, when a signal is received through the first antenna 330, the duplexer 231 may receive the signal output from the notch filter 324 or the coupler 325 and transfer the received signal to the matching circuit 321. The matching circuit 321 may receive a signal from the duplexer 323 and transmit the received signal to a reception terminal 311 of the processor 310.

According to various embodiments, the notch filter 324 may filter the spurious components of the signal received from the duplexer 323 to avoid interference between the signal transmitted or received through the first antenna 330 and the signal transmitted or received through the second antenna 340. For example, when the electronic device 101 transmits a first signal to a first communication network (e.g., an LTE network) through the first antenna 330 and receives a GPS signal through the second antenna 340, the electronic device 101 may measure the magnitude (e.g., amplitude) of the second harmonic frequency component (or referred to as a second harmonic component as well) for the first signal received from the duplexer 323 and filter the spurious components for the first signal to avoid interference between the first signal and the second signal. The first signal may include a signal transmitted or received based on a 13th band or a 14th band of long term evolution (LTE).

According to various embodiments, the coupler 325 may be connected between the antenna switching module 326 and the duplexer 323 or may be connected between the antenna switching module 326 and the notch filter 324. For example, if no interference occurs between the first signal (e.g., an LTE signal) and the second signal (e.g., a GPS signal), the coupler 325 may transfer the signal received through the first antenna 330 to the duplexer 323 and may directly receive the signal output from the duplexer 323. As another example, when interference occurs between the first signal and the second signal, the coupler 325 may transmit the signal received through the first antenna 330 to the notch filter 324 and may directly receive the signal output from the notch filter 324.

According to various embodiments, the coupler 325 may individually detect the signal transmitted through the first antenna 330 and the signal received through the first antenna 330. According to an embodiment, the coupler 325 may branch part (e.g., a coupling signal) of the signal (e.g., the first signal) transmitted from the duplexer 323, transfer part of the signal to the processor 310 through the divider 327, and output the rest of the signal to the antenna switching module 326. The coupler 325 may divide at least one signal output through the duplexer 323 or the notch filter 324 into a signal radiated through the first antenna 330 and a signal that is not radiated but reflected (e.g., coupling signal), and transfer the reflected signal through the divider 327 to the processor 310. For example, some of the signals may be fed back from the coupler 325 through the divider 327 to the processor 310 (e.g., the transmission power feedback circuit 313). As another example, some of the transmission signals may be fed back from the coupler 325 to the processor 310 (e.g., the second harmonic feedback circuit 314) through the divider 327 and the BPF 328. According to an embodiment, the coupling signal branched from the coupler 325 may include a forward coupling signal or a reverse coupling signal. The forward coupling signal is a signal fed back without being radiated to an external communication network through the first antenna 330, and may have the same frequency and phase as the frequency and phase of the signal radiated through the first antenna 330. The reverse coupling signal is a partial signal of the signal received from an external communication network through the first antenna 330. According to an embodiment, the coupler 325 may branch some of the signals transferred from the antenna switching module 326, transmit a part of the signal to the processor 310 through the divider 327, and output the rest of the signal to the duplexer 323 or the notch filter 324.

According to various embodiments, the antenna switching module 326 may select a path for connecting the first antenna 330 and the coupler 325. For example, when the electronic device 101 transmits a signal to the first communication network (e.g., an LTE network), the antenna switching module 326 may transmit the signal output from the coupler 325 to the first antenna 330. As another example, when the electronic device 101 receives a signal from the first communication network (e.g., an LTE network), the antenna switching module 326 may transfer the signal received from the first antenna 330 into the coupler 325. The antenna switching module 326 may include a plurality of functional elements 326c, 326d, 326e, and 326f, and each functional element may include an inductor and a capacitor. The antenna switching module 326 may include switches 326a and 326b for connecting any one functional element (e.g., 326c) of the plurality of functional elements 326c, 326d, 326e, and 326f to the coupler 325 and the first antenna 330. Among the plurality of functional elements 326c, 326d, 326e, and 326f, any one functional element that does not generate resonance with the second antenna 340 may be selected. An inductor is a passive device that uses the electromagnetic action generated as a current flows through a conducting line wound around a core, and a capacitor is a device that stores electric capacitance. Further, each inductor may have a different value, and each capacitor may have a different value. The antenna switching module 326 may switch to any one functional element 326c, which does not generate resonance for the first antenna 330, among the plurality of functional elements among the plurality of functional elements 326c, 326d, 326e, and 326f to avoid interference between the first signal transmitted or received through the first antenna 330 and the second signal transmitted or received through the second antenna 340. Interference between the first signal (e.g., an LTE-based signal) transmitted or received through the first antenna 330 and the second signal (e.g., a GPS signal) received through the second antenna 340 may be avoided.

According to various embodiments, the divider 327 may receive a coupling signal fed back from the coupler 325. The divider 327 may divide the power of the coupling signal received from the coupler 325 and outputs signals based on the divided power to the transmission power feedback circuit 313 and the second harmonic feedback circuit 314, respectively. The second harmonic feedback circuit 314 may measure the magnitude (e.g., amplitude) of the second harmonic frequency component of the received signal. The coupling signal may include a forward coupling signal or a reverse coupling signal. The forward coupling signal is a signal fed back without being radiated to an external communication network through the first antenna 330, and may have the same frequency and phase as the frequency and phase of the signal radiated through the first antenna 330. The reverse coupling signal is a partial signal of the signal received from an external communication network through the first antenna 330. The second harmonic frequency is a frequency obtained by multiplying a designated transmission or reception frequency (e.g., a transmission frequency of the 13th band of LTE) by a predetermined multiple (e.g., two times), and the magnitude of the second harmonic frequency component refers to the amplitude of the signal component of the frequency obtained by multiplying the predetermined transmission or reception frequency by the predetermined multiple (e.g., two times).

According to various embodiments, in LTE, the transmission frequency of the 13th band is 777 MHz to 787 MHz, and the reception frequency is 746 MHz to 756 MHz. In LTE, the transmission frequency of the 14th band is 788 MHz to 798 MHz, and the reception frequency is 758 MHz to 768 MHz. However, in LTE, the second harmonic frequencies for the transmission frequencies of the 13th and 14th bands are 1554 MHz to 1574 MHz and 1576 MHz to 1596 MHz, respectively, and as these second harmonic frequencies are adjacent to the GPS frequency of 1575.42 MHz, the first signal (e.g., an LTE signal) and the second signal (e.g., a GPS signal) may interfere with each other. Under the control of the processor 310 (e.g., the processor 120 of FIG. 1), the second harmonic feedback circuit 314 may receive a partial signal, i.e., the coupling signal, of the first signal which is not radiated through the first antenna 330 to an external communication network but fed back from the coupler 325 and measure the magnitude (e.g., amplitude) of the component (e.g., the second harmonic frequency component) corresponding to the designated frequency band of the received coupling signal. The processor 310 (e.g., the processor 120 of FIG. 1) may identify whether the magnitude of the component corresponding to the designated frequency band exceeds a designated threshold. The divider 327 may transfer a part of the coupling signal to the transmission power feedback circuit 313 in the processor 310, and the processor 310 (e.g., the processor 120 of FIG. 1) may measure the magnitude of the second harmonic frequency component for the signal transmitted through the first antenna 330 via the part of the coupling signal received from the divider 327.

According to various embodiments, the BPF 328 may transmit a signal present in a frequency within a predetermined range and remove a signal outside the predetermined range. The BPF 328 may transfer the second harmonic frequency component which is left after removing the frequency part which does not interfere with the frequency of the second signal from the part of the coupling signal divided by the divider 327 to the second harmonic feedback circuit 314 of the processor 310. The LNA 329, as a low-noise amplifier, may amplify the signal received from the second antenna 340 and transmit it to the GPS reception terminal 315 in the processor 310. The LNA 329 may amplify a weak signal detected at the second antenna 340 and transmit the same to the GPS reception terminal 315 of the processor 310 and, to reduce attenuation in the transmission line, the LNA 329 may be disposed adjacent to the second antenna 340.

According to various embodiments, the battery 189 may supply current to at least one component of the electronic device 101. The battery 189 may supply current to at least one component in the wireless communication module 320 (e.g., the wireless communication module 192 of FIG. 1). The battery 189 may increase and supply a current so that the signal output from the transmission terminal 312 in the processor 310 is amplified by the power amplifier 322. According to an embodiment, the battery 189 may supply a second current (e.g., 400 mA) greater than a first current (e.g., 250 mA) required to operate the power amplifier 322 to the power amplifier 322 under the control of the processor 310 (e.g., the processor 120 of FIG. 1) to allow the interference between the first signal transmitted or received through the first antenna 330 and the second signal received through the second antenna 340 to be avoided. According to an embodiment, the battery 189 may reduce the first power (e.g., 25 dBm) consumed in the electronic device 101 to second power (e.g., 23 dBm) and supply the second power to the processor 310 (e.g., the processor 120 of FIG. 1), to transmit the first signal through the first antenna 330 to the communication network under the control of the processor 310 (e.g., the processor 120 of FIG. 1) to allow the interference between the first signal transmitted or received through the first antenna 330 and the second signal received through the second antenna 340 to be avoided.

According to various embodiments, the processor 310 may execute at least one operation or function performed by the processor 120 of FIG. 1. The processor 310 (e.g., the processor 120 of FIG. 1) may control the overall operation of transmitting and receiving signals through the first antenna 330 or the second antenna 340. The processor 310 (e.g., the processor 120 of FIG. 1) may generate a signal for transmission to a first communication network (e.g., an LTE network) through the first antenna 330. The processor 310 (e.g., the processor 120 of FIG. 1) may transfer a signal, in which data is loaded onto a carrier, to the power amplifier 322. The signal may include data to be transmitted by the electronic device 101 to another electronic device (e.g., 104) or a base station (not shown), and may be used by simply fixing a characteristic frequency or may be generated using a continuous wave (CW) signal composed of a single tone of industrial science medical (ISM) band. Further, the signal may be transmitted to the outside of the electronic device 101 through the first antenna 330 in the form of electromagnetic waves through the duplexer 323, the notch filter 324, the coupler 325, and the antenna switching module 326. To generate the signal, the processor 310 (e.g., the processor 120 of FIG. 1) may include an oscillator (not shown) that generates a carrier. The processor 310 (e.g., the processor 120 of FIG. 1) may include a modulation circuit that performs a modulation operation of loading the signal onto a carrier generated from the oscillator. The processor 310 (e.g., the processor 120 of FIG. 1) may include a radio frequency (RF) amplifier that amplifies the modulated carrier to reinforce the strength of the signal.

According to various embodiments, the processor 310 (e.g., the processor 120 of FIG. 1) may receive the signal received through the first antenna 330, via the antenna switching module 326, the coupler 325, the notch filter 324, the duplexer 323, and the matching circuit 321. The processor 310 may receive the received signal from the first antenna 330 and extract data carried on the carrier from the signal. The processor 310 may transfer the extracted data to the processor (processor 120 of FIG. 1) or the memory (the memory 130 of FIG. 1). The signal may include the data received by the electronic device 101 from another electronic device 104 or a base station (not shown). The processor 310 may include a demodulation circuit that performs a demodulation operation of extracting the data from the signal to process the received signal.

According to various embodiments, the processor 310 (e.g., the processor 120 of FIG. 1) may control the second harmonic feedback circuit 314 to measure the magnitude of the coupling signal (e.g., a partial signal of the first signal) fed back from the coupler from the first signal (e.g., an LTE signal) transmitted or received through the first antenna 330. The processor 310 may identify whether the magnitude of a component corresponding to a designated frequency band of the measured coupling signal exceeds a designated threshold. The designated threshold may be set to a value within a range in which no interference occurs between the signal transmitted received through the first antenna 330 and the signal transmitted or received through the second antenna 340. The designated threshold may be variably set depending on the type of the communication network and the type of the signals transmitted or received, or may be changed in real-time so that no interference occurs between the transmitted and received signals. The designated threshold may be set or changed to different values according to various situations, such as electric field levels based on the current location of the electronic device 101, the states in which the electronic device 101 is held, and weak electric field areas.

According to various embodiments, the processor 310 (e.g., the processor 120 of FIG. 1) may control at least one of the second harmonic feedback circuit 314, the divider 327, or the BPF 328 to measure the magnitude of the second harmonic frequency component and, if the measured magnitude exceeds a designated threshold, control at least some elements of the electronic device 101 to allow the measured magnitude to be reduced to a designated threshold or less. The processor 310 may avoid (or remove) interference between the first signal transmitted or received through the first antenna 330 and the second signal (e.g., a GPS signal) received through the second antenna 340. Upon determining that the second harmonic frequency related to the first signal overlaps, or is adjacent to, the frequency of the second signal transmitted or received through the second antenna 340, the processor 310 may control some elements to reduce the magnitude of the second harmonic frequency component so that interference between the first signal and the second signal is avoided.

According to various embodiments, the processor 310 (e.g., the processor 120 of FIG. 1) may avoid interference between the first signal and the second signal by reducing the magnitude of the second harmonic frequency component to the designated threshold or less using at least one of increasing the current supplied to the power amplifier 322, reducing the power for transmitting the first signal through the first antenna 330, or switching into a functional element where no resonance occurs on the first antenna 330 transmitting the first signal. According to an embodiment, the processor 310 may increase the current supplied to the power amplifier 322 by a predetermined multiple based on the linearity and interference avoidance for the signal to be amplified by the power amplifier 322 and supply the same to the power amplifier 322. To enhance the current consumed by the electronic device 101, the power amplifier 322 is designed to operate in a compression region. The processor 310 may determine the current supplied to the power amplifier 322 by properly adjusting the trade-off based on the efficiency of removing noise and the linearity of the power amplifier 322. For example, if the linearity increases, the magnitude of the harmonic frequency may decrease, and if the linearity decreases, the interference may increase. The processor 310 may supply a current (e.g., 400 mA) corresponding to a voltage (e.g., 4.2V) higher than the current (e.g., 250 mA) for a bias voltage (e.g., 3.4V) for operating the power amplifier 322 to the power amplifier 322.

According to various embodiments, the processor 310 (e.g., the processor 120 of FIG. 1) may control the output voltage of the battery 189 to reduce the power necessary to radiate the first signal through the first antenna 330 and avoid interference between the signals transmitted or received between the first antenna 330 and the second antenna 340 through the controlled output voltage. The processor 310 may control the battery 189 to supply less power (e.g., 22 dBm to 23 dBm) than the maximum power (e.g., 24 dBm) required to radiate the first signal to a communication network (e.g., LTE network), thereby radiating the first signal through the first antenna 330.

According to various embodiments, the processor 310 (e.g., the processor 120 of FIG. 1) may avoid interference between the first signal and the second signal by switching the first antenna 330 for transmitting the first signal to a functional element 326c, where no resonance occurs, among the plurality of elements 326c, 326d, 326e, and 326f included in the antenna switching module 326. The antenna switching module 326 included in the wireless communication module 320 (e.g., the wireless communication module 192 of FIG. 1) may include a plurality of functional elements, and each functional element may include an inductor and a capacitor. Each of the inductors may have a different value, and (or) each capacitor may have a different value. Since the plurality of functional elements have different inductances and capacitances, the functional elements may have different resonance characteristics. Each functional element may have a different code value tuned in software, and an appropriate functional element may be selected so that the first signal and the second signal do not interfere with each other. As such, the processor 310 (e.g., the processor 120 of FIG. 1) may switch into any one functional element 326c where no resonance occurs for the first antenna 330 among the plurality of functional elements 326c, 326d, 326e, and 326f included in the antenna switching module 326 to avoid interference between the first signal (e.g., an LTE-based signal) transmitted or received through the first antenna 330 and the second signal (e.g., a GPS signal) received through the second antenna 340.

According to various embodiments, an electronic device 101 may comprise a first antenna 330 and a second antenna 340, a battery 189, a wireless communication module 320 (e.g., the wireless communication module 192 of FIG. 1) having a coupler 325, and a processor 310 (e.g., the processor 120 of FIG. 1) electrically connected with the first antenna 330 and the second antenna 340, the battery, and the wireless communication module 320 (e.g., the wireless communication module 192 of FIG. 1). The processor 310 (e.g., the processor 120 of FIG. 1) may be configured to measure a magnitude of a component corresponding to a designated frequency band of a coupling signal fed back from the coupler 325 based on a first signal transmitted or received through the first antenna 330, compare the measured magnitude with a designated threshold, and control at least some elements of the electronic device to allow the measured magnitude to be reduced to the designated threshold or less if the measured magnitude exceeds the designated threshold.

According to various embodiments, the processor 310 (e.g., the processor 120 of FIG. 1) may be configured to perform at least one of increasing a current supplied to a power amplifier 322 provided in the wireless communication module 320 (e.g., the wireless communication module 192 of FIG. 1), reducing power for transmitting the first signal through the first antenna 330, or switching into a functional element where no resonance occurs for the first antenna 330 transmitting the first signal to allow the measured magnitude to be reduced to the designated threshold or less.

According to an embodiment, the processor 310 (e.g., the processor 120 of FIG. 1) may be configured to increase the current supplied to the power amplifier 322 based on linearity for a signal to be amplified by the power amplifier and supply the increased current to the power amplifier 322.

According to an embodiment, the processor 310 (e.g., the processor 120 of FIG. 1) may be configured to reduce first power supplied from the battery 189 to second power to transmit the first signal through the first antenna 330 to a communication network.

According to an embodiment, the processor 310 (e.g., the processor 120 of FIG. 1) may be configured to select a functional element where no resonance occurs with the second antenna 340 in an antenna switching module 326 including a plurality of functional elements.

According to an embodiment, the magnitude of the component corresponding to the designated frequency band denotes an amplitude of a signal having a frequency obtained by multiplying a designated transmission or reception frequency by 2.

According to an embodiment, the first signal may be a signal transmitted or received based on a 13th and 14th band of LTE, and the second signal may include a global positioning system (GPS) signal.

According to an embodiment, the coupling signal may include any one of a forward coupling signal which results as a signal transmitted through the first antenna 330 is fed back from the coupler 325 or a reverse coupling signal which results as a signal received through the first antenna 330 is fed back from the coupler 325.

According to an embodiment, the electronic device 101 may further comprise a band pass filter disposed between the processor 310 and the coupler 325. The band pass filter may be configured to transmit a second harmonic frequency component of the coupling signal.

According to an embodiment, the first signal may be a signal transmitted or received based on a 13th and 14th band of LTE, and the second signal may include a global positioning system (GPS) signal.

Figure 4:
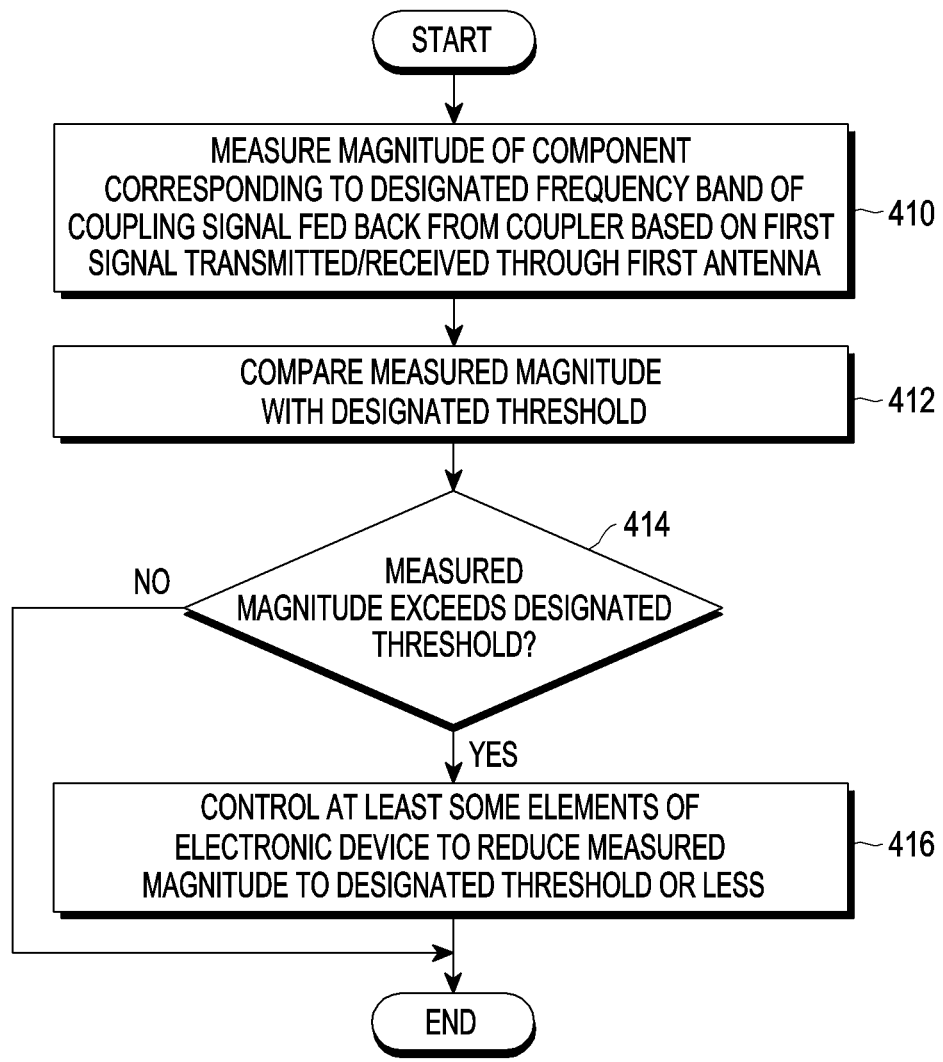
FIG. 4 is a flowchart illustrating an operation for avoiding interference between signals transmitted and received through first and second antennas in an electronic device, according to various embodiments.

FIG. 4 is a flowchart illustrating an operation for avoiding interference between signals transmitted and received through first and second antennas in an electronic device, according to various embodiments.

Described below in detail with reference to FIGS. 3 and 4 is the operation of avoiding interference between signals transmitted or received through first and second antennas among a plurality of antennas provided in an electronic device according to various embodiments.

In operation 410, the electronic device 101 (e.g., the processor 310) may identify a component corresponding to a designated frequency band of a coupling signal fed back from the coupler 325 based on the first signal transmitted or received through the first antenna 330 and measure the magnitude of the component. The electronic device 101 (e.g., the processor 310) may measure the magnitude (e.g., amplitude) of a second harmonic frequency component of a coupling signal for the first signal output from the notch filter 324. The magnitude of the second harmonic frequency component may be the amplitude of the signal component of the frequency obtained by multiplying a designated transmission or reception frequency by the predetermined multiple (e.g., two times). The coupling signal may include a forward coupling signal, which is not radiated through the first antenna 330 to an external communication network but fed back, and/or a partial signal of the signal received from the external communication network through the first antenna 330, i.e., a reverse coupling signal.

In operation 412, the electronic device 101 (e.g., the processor 310) may compare the measured magnitude with a designated threshold. The electronic device 101 (e.g., the processor 310) may compare the magnitude of the second harmonic frequency component of the coupling signal, which is not radiated through the first antenna 330 to the external communication network but fed back, with the designated threshold (e.g., amplitude). The designated threshold may be set to a value within a range in which no interference occurs between the first signal transmitted or received through the first antenna 330 and the second signal transmitted or received through the second antenna 340. The designated threshold may be variably set depending on the type of the communication network and the type of the signals transmitted or received, or may be changed in real-time so that no interference occurs between the transmitted and received signals. The designated threshold may be set or changed to different values according to various situations, such as electric field levels based on the current location of the electronic device 101, the states in which the electronic device 101 is held, and weak electric field areas.

In operation 414, the electronic device 101 (e.g., the processor 310) may identify whether the measured magnitude exceeds the designated threshold. The electronic device 101 (e.g., the processor 310) may identify whether the magnitude of the second harmonic frequency component of the measured coupling signal exceeds the designated threshold, or whether the magnitude of the second harmonic frequency of the measured coupling signal does not exceed the designated threshold. For example, if the magnitude of the second harmonic frequency of the measured coupling signal does not exceed the designated threshold in operation 414, the electronic device 101 (e.g., the processor 310) may determine that no interference has occurred between the first signal transmitted or received through the first antenna 330 and the second signal transmitted or received through the second antenna 340.

In operation 416, when the magnitude of the component corresponding to the designated frequency band of the coupling signal exceeds the designated threshold, the electronic device 101 (e.g., the processor 310) may control at least some elements of the electronic device 101 so that the measured magnitude is reduced to the designated threshold or less. The processor 101 (e.g., the processor 310 of FIG. 1) may reduce the measured magnitude to the designated threshold using at least one of increasing a current supplied to a power amplifier 322 provided in the wireless communication module 320 (e.g., the wireless communication module 192 of FIG. 1), reducing power for transmitting the first signal through the first antenna 330, or switching into a functional element where no resonance occurs for the first antenna 330 transmitting the first signal.

According to various embodiments, the electronic device 101 (e.g., the processor 310) may increase the current supplied to the power amplifier 322 by a predetermined multiple based on the linearity and interference avoidance for the signal to be amplified by the power amplifier 322 and supply the same to the power amplifier 322, thereby reducing the magnitude of the component corresponding to the designated frequency band of the coupling signal to the designated threshold or less. According to an embodiment, the electronic device 101 (e.g., the processor 310) may supply the current (e.g., 400 mA) corresponding to a voltage (e.g., 4.2V) higher than the current (e.g., 250 mA) for the bias voltage (e.g., 3.4V) to operate the power amplifier 322, thereby reducing the magnitude (e.g., amplitude) for the second harmonic frequency of the coupling signal fed back from the coupler 325 based on the first signal.

According to an embodiment, the electronic device 101 (e.g., the processor 310) may reduce the first power (e.g., 24 dBm) supplied from the battery 189 for transmitting the first signal through the first antenna 330 to the communication network to second power (e.g., 23 dBm to 22 dBm), thereby decreasing the magnitude (e.g., amplitude) for the second harmonic frequency of the coupling signal fed back from the coupler 325 based on the first signal.

According to an embodiment, the electronic device 101 (e.g., the processor 310) may reduce the magnitude (e.g., amplitude) for the second harmonic frequency of the coupling signal fed back from the coupler 325 based on the first signal, by switching into a functional element where no resonance occurs with the second antenna 340 in the antenna switching module 326 including a plurality of functional elements.

According to various embodiments, the processor 101 (e.g., the processor 310 of FIG. 1) may avoid interference between the first signal and the second signal by reducing the magnitude (e.g., amplitude) for the second harmonic frequency of the coupling signal fed back from the coupler 325 based on the first signal using at least one of increasing a current supplied to a power amplifier 322 provided in the wireless communication module 320 (e.g., the wireless communication module 192 of FIG. 1), reducing power for transmitting the first signal through the first antenna 330, or switching into a functional element where no resonance occurs for the first antenna 330 transmitting the first signal.

Figure 5:
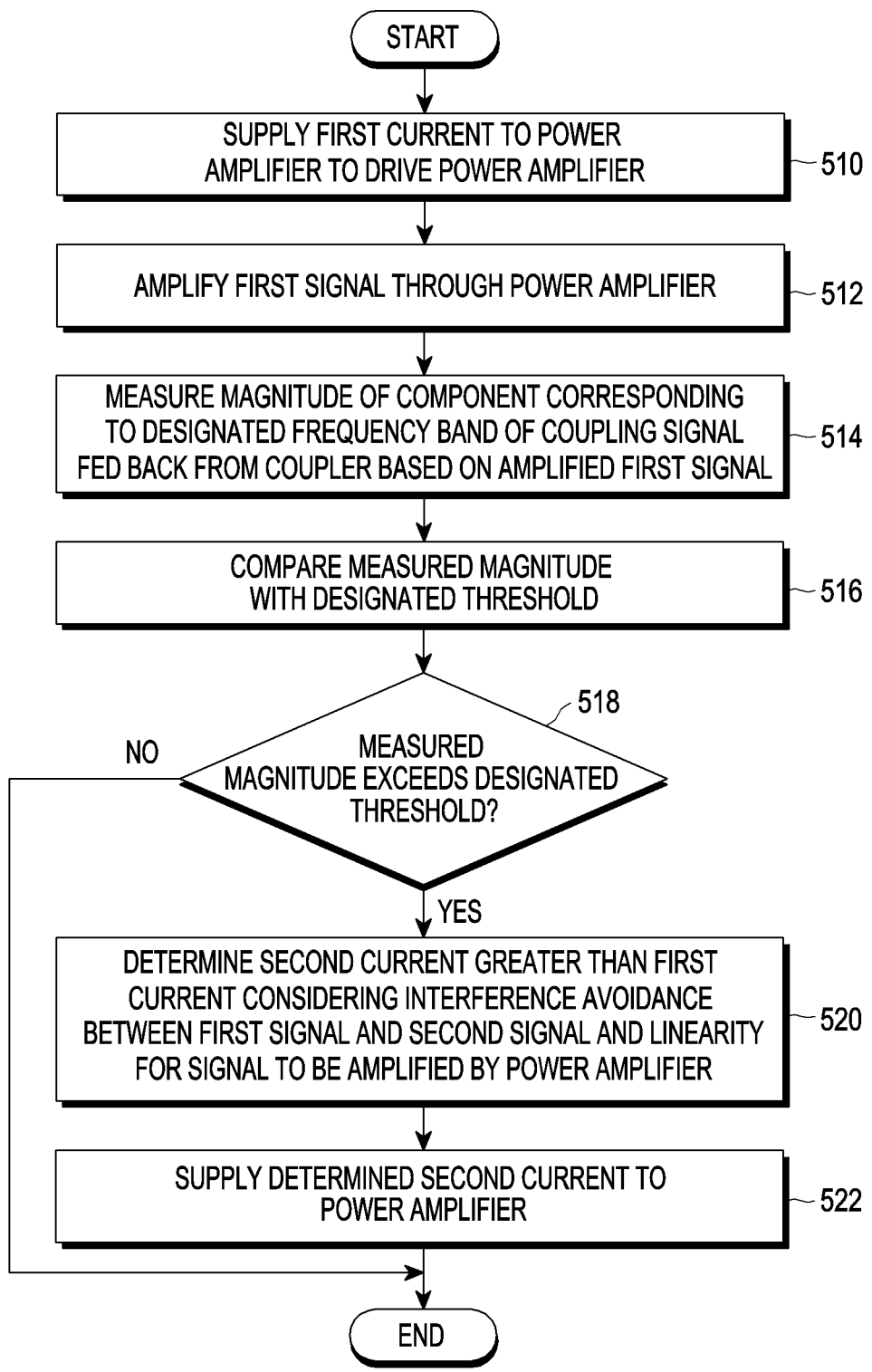
FIG. 5 is a flowchart illustrating an operation for increasing and supplying a current to a power amplifier so as to avoid interference between signals transmitted and received through first and second antennas in an electronic device according to various embodiments.

FIG. 5 is a flowchart illustrating an operation for increasing and supplying a current to a power amplifier so as to avoid interference between signals transmitted and received through first and second antennas in an electronic device according to various embodiments.

Described below in detail with reference to FIGS. 3 and 5 is an operation for increasing and supplying a current to a power amplifier so as to avoid interference between signals transmitted and received through first and second antennas in an electronic device according to various embodiments.

In operation 510, the electronic device 101 (e.g., the processor 310) may drive the power amplifier 322 by supplying the first current to the power amplifier 322. The electronic device 101 (e.g., the processor 310) may supply a current (e.g., 250 mA) for a bias voltage (e.g., 3.4V) to the power amplifier 322, which amplifies the first signal, to transmit the first signal to the communication network (e.g., LTE). The bias voltage may be a voltage required to radiate the first signal through the first antenna 330.

In operation 512, the electronic device 101 (e.g., the processor 310) may amplify the first signal through the power amplifier 322. The electronic device 101 (e.g., the processor 310) may drive the power amplifier 322 and then amplify the first signal output from the processor 310. The electronic device 101 (e.g., the processor 310) may generate a signal for transmission to the communication network through the first antenna 330 and amplify the generated signal using the bias voltage (e.g., 3.4V).

Operations 514, 516, and 518 may include at least one operation performed in operations 410, 412, and 414 of FIG. 4.

In operation 520, the electronic device 101 (e.g., the processor 310) may determine the second current greater than the first current considering the linearity for the signal to be amplified by the power amplifier 322 and avoidance of interference between the first signal and the second signal. The electronic device 101 (e.g., the processor 310) may increase the current supplied to the power amplifier 322 by a predetermined multiple based on the linearity and interference avoidance for the signal to be amplified by the power amplifier 322 and supply the same to the power amplifier 322. The electronic device 101 (e.g., the processor 310) may determine the current to be supplied to the power amplifier 322 by properly adjusting the trade-off based on the efficiency of removing noise and the linearity of the power amplifier 322. For example, if the linearity increases, the magnitude of the harmonic frequency may decrease, and if the linearity decreases, the interference may increase. The processor 310 may determine a current (e.g., 400 mA) corresponding to a voltage (e.g., 4.2V) higher than the current (e.g., 250 mA) for a bias voltage (e.g., 3.4V) for operating the power amplifier 322 and control the battery 189 to supply the determined current to the power amplifier 322.

In operation 522, the electronic device 101 (e.g., the processor 310) may supply the determined second current to the power amplifier 322. The electronic device 101 (e.g., the processor 310) may supply the current determined based on the linearity of the power amplifier 322 and the efficiency of removing noise to the power amplifier 322, thereby avoiding interference between the first signal transmitted or received through the first antenna 330 and the second signal transmitted or received through the second antenna 340.

Each operation of FIG. 5 may be performed by at least one of at least one processor (e.g., the processor 120 or 310) or a controller of the electronic device. According to an embodiment, at least one of operations 510 to 522 may be omitted, some operations may be performed in parallel, or some operations may be changed in order or other operations may be added.

Figure 6:
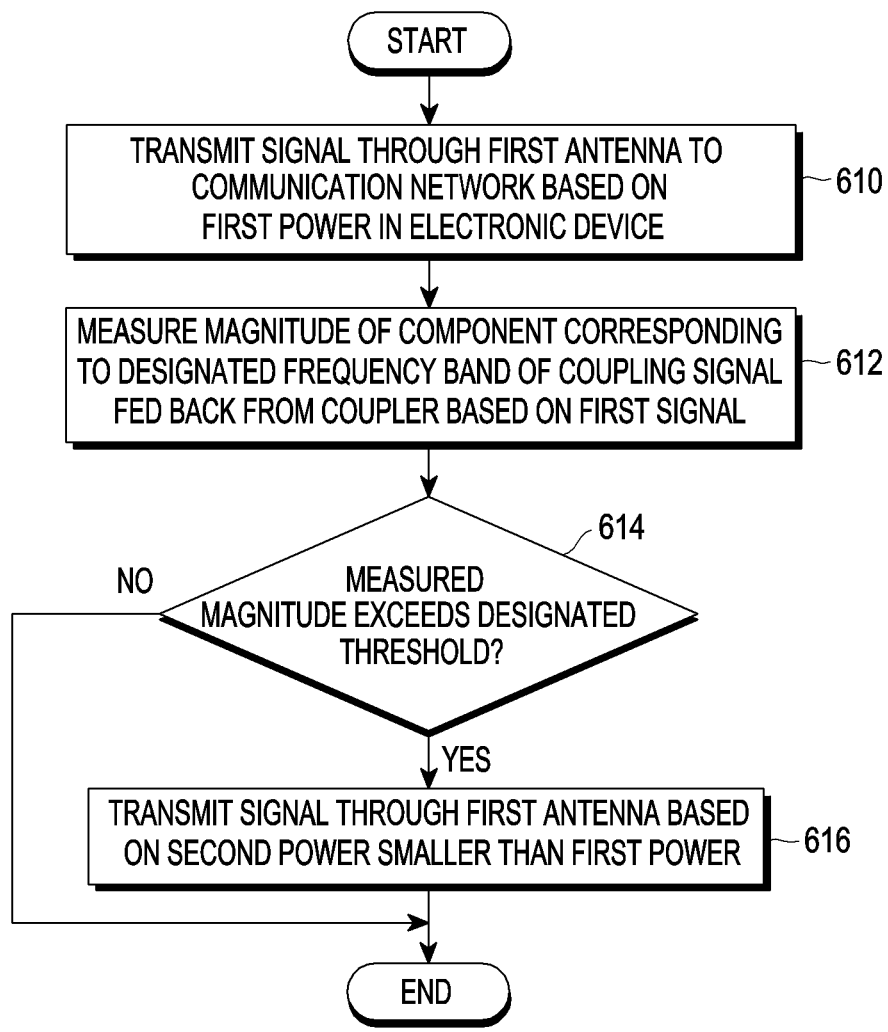
FIG. 6 is a flowchart illustrating an operation for reducing power for transmitting signals to avoid interference between signals transmitted and received through first and second antennas in an electronic device according to various embodiments of the present disclosure.

FIG. 6 is a flowchart illustrating an operation for reducing power for transmitting signals to avoid interference between signals transmitted and received through first and second antennas in an electronic device according to various embodiments of the present disclosure.

Described below in detail with reference to FIGS. 3 and 6 is an operation for reducing power for transmitting signals to avoid interference between signals transmitted and received through first and second antennas in an electronic device according to various embodiments of the present disclosure.

In operation 610, the electronic device 101 (e.g., the processor 310) may transmit a signal through the first antenna to a communication network based on first power. The electronic device 101 (e.g., the processor 310) may transmit a signal through the first antenna 330 to the external communication network using the maximum power (e.g., 24 dBm). The electronic device 101 (e.g., the processor 310) may transmit or receive the first signal and the second signal through the first and second antennas, respectively, based on the maximum power (e.g., 24 dBm).

Operations 612 and 614 may include at least one operation performed in operations 410, 412, and 414 of FIG. 4.

In operation 616, the electronic device 101 (e.g., the processor 310) may transmit a signal through the first antenna based on second power less than the first power. If interference occurs between the first signal and the second signal in the state where the first signal and the second signal are transmitted or received through the first and second antennas based on the maximum power (e.g., 24 dBm), the electronic device 101 (e.g., the processor 310) may reduce the maximum power (e.g., 24 dBm) output from the battery 189 to predetermined power (e.g., 22 dBm to 23 dBm), thereby avoiding interference between the first signal and the second signal. The processor 310 may control the battery 189 to supply less power (e.g., 22 dBm to 23 dBm) than the maximum power (e.g., 24 dBm) required to radiate the first signal to a communication network (e.g., LTE network), thereby radiating the first signal through the first antenna 330.

Each operation of FIG. 6 may be performed by at least one of at least one processor (e.g., the processor 120 or 310) or a controller of the electronic device. According to an embodiment, at least one of operations 610 to 616 may be omitted, some operations may be performed in parallel, or some operations may be changed in order or other operations may be added.

Figure 7:
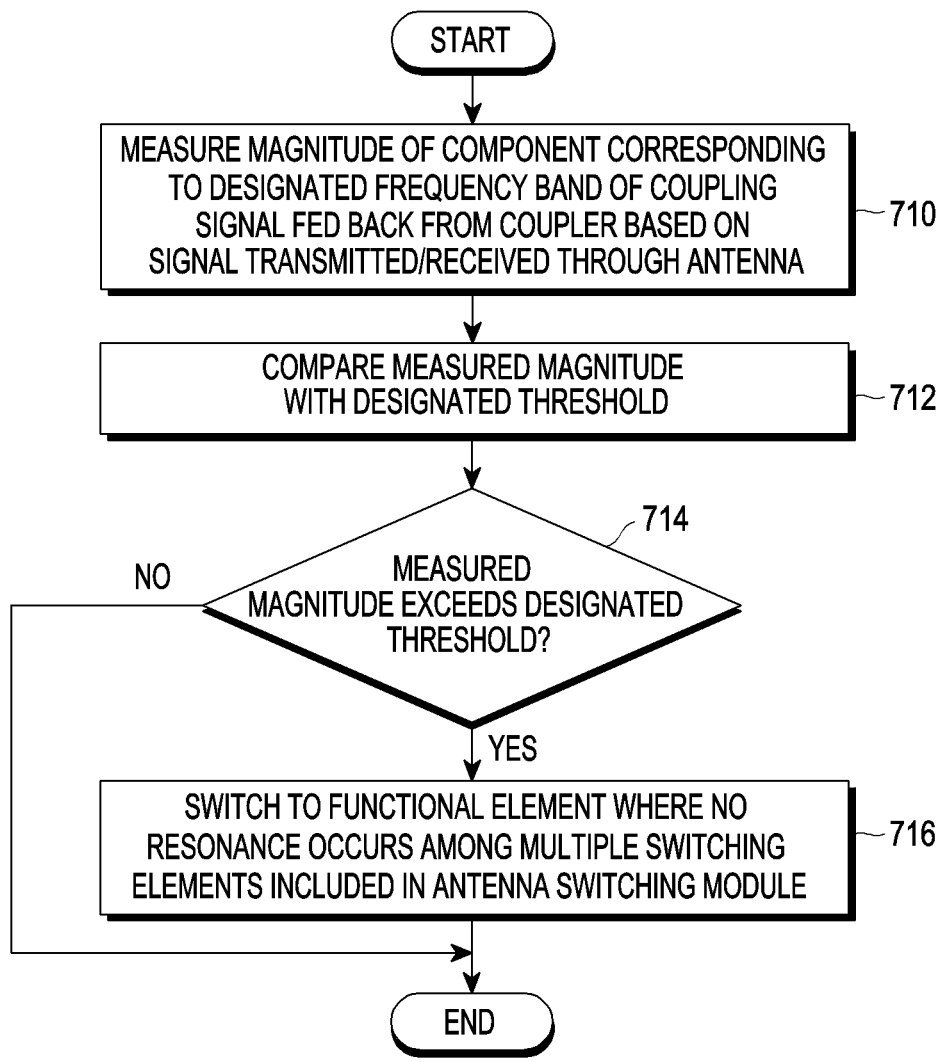
FIG. 7 is a flowchart illustrating an operation for switching antennas to avoid interference between signals transmitted and received through first and second antennas in an electronic device, according to various embodiments.

FIG. 7 is a flowchart illustrating an operation for switching antennas to avoid interference between signals transmitted and received through first and second antennas in an electronic device, according to various embodiments.

Described below in detail with reference to FIGS. 3 and 7 is an operation for switching an antenna to a functional element where no resonance occurs to avoid interference between signals transmitted and received through first and second antennas in an electronic device, according to various embodiments.

Operations 710, 712, and 714 may include at least one operation performed in operations 410, 412, and 414 of FIG. 4.

In operation 716, the electronic device 101 (e.g., the processor 310) may switch the antenna to a functional element that does not generate resonance among a plurality of functional elements included in the antenna switching module 326. The antenna switching module 326 may include a plurality of functional elements, and each functional element may include an inductor and a capacitor, and each inductor and each capacitor may have different values. The electronic device 101 (e.g., the processor 310) may switch into any one functional element, where no resonance occurs for the first antenna 330, among the plurality of functional elements to avoid interference between the first signal transmitted or received through the first antenna 330 and the signal transmitted or received through the second antenna 340. Such switching allows for avoidance of interference between the first signal (e.g., an LTE-based signal) transmitted or received through the first antenna 330 and the second signal (e.g., a GPS signal) received through the second antenna 340.

Each operation of FIG. 7 may be performed by at least one of at least one processor (e.g., the processor 120 or 310) or a controller of the electronic device. According to an embodiment, at least one of operations 710 to 716 may be omitted, some operations may be performed in parallel, or some operations may be changed in order or other operations may be added.

According to various embodiments, a method for avoiding interference between signals transmitted or received through a first antenna 330 and a second antenna 340 may comprise measuring a magnitude of a component corresponding to a designated frequency band of a coupling signal fed back from a coupler 325 based on a first signal transmitted or received through a first antenna, comparing the measured magnitude with a designated threshold, and controlling at least some elements of the electronic device to allow the measured magnitude to be reduced to the designated threshold or less if the measured magnitude exceeds the designated threshold.

According to an embodiment, reducing the measured magnitude to the designated threshold or less may include increasing a current supplied to a power amplifier 322 amplifying the first signal, reducing power for transmitting the first signal through the first antenna 330 or switching to a functional element (e.g., 326c) in which no resonance occurs for the first antenna 330 transmitting the first signal.

According to an embodiment, increasing the current supplied to the power amplifier 322 amplifying the first signal may include increasing the current supplied to the power amplifier 322 by a predetermined multiple based on linearity for a signal to be amplified by the power amplifier, and supplying the current increased by the predetermined multiple to the power amplifier 322.

According to an embodiment, reducing the power for transmitting the first signal through the first antenna 330 may include reducing first power to second power to transmit the first signal through the first antenna 330 to a communication network.

According to an embodiment, switching to the functional element in which no resonance occurs for the first antenna 330 transmitting the first signal may include selecting a functional element where no resonance occurs with the second antenna 340 in an antenna switching module 326 including a plurality of functional elements.

According to an embodiment, the magnitude of the component corresponding to the designated frequency band may be an amplitude of a signal having a frequency obtained by multiplying a designated transmission or reception frequency by 2.

According to an embodiment, the first signal may be a signal transmitted or received based on a 13th and 14th band of LTE, and the second signal may be a global positioning system (GPS) signal.

According to an embodiment, the coupling signal may include any one of a forward coupling signal which results as a signal transmitted through the first antenna 330 is fed back from the coupler 325 or a reverse coupling signal which results as a signal received through the first antenna 330 is fed back from the coupler 325.

According to an embodiment, the first signal may be a signal transmitted or received based on a 13th and 14th band of LTE, and the second signal may include a global positioning system (GPS) signal.

FIG. 8 is a view illustrating an example table for LTE bands and frequencies of each band according to various embodiments.

Referring to FIG. 8, LTE has 31 bands and, in each band, the uplink frequency band and the downlink frequency band differ from each other. For example, the 13th band 810 of LTE has an uplink frequency band of 777 MHz to 787 MHz and a downlink frequency band of 746 MHz to 756 MHz. The width of the uplink frequency band of the 13th band 810 of LTE is 10 MHz, the lowest frequency (e.g., 777 MHz) of the uplink frequency band and the lowest frequency (e.g., 746 Mhz) of the downlink frequency band have a duplex spacing of −31 MHz, and the highest frequency (e.g., 787 MHz) of the uplink frequency band and the lowest frequency (e.g., 746 MHz) of the downlink frequency band have a gap of 41 MHz. Similarly, the 14th band 820 of LTE has an uplink frequency band of 788 MHz to 798 MHz and a downlink frequency band of 758 MHz to 768 MHz. The width of the uplink frequency band of the 14th band 820 of LTE is 10 MHz, the lowest frequency (e.g., 788 MHz) of the uplink frequency band and the lowest frequency (e.g., 758 MHz) of the downlink frequency band have a duplex spacing of −30 MHz, and the highest frequency (e.g., 798 MHz) of the uplink frequency band and the lowest frequency (e.g., 758 MHz) of the downlink frequency band have a gap of 40 MHz.

As such, in LTE, the second harmonic frequencies for the uplink frequencies of the 13th and 14th bands are 1554 MHz to 1574 MHz and 1576 MHz to 1596 MHz, respectively, and these second harmonic frequencies are adjacent to the GPS frequency of 1575.42 MHz, thereby interfering with each other. Through various embodiments of avoiding interference between signals disclosed in the disclosure, it is possible to avoid the GPS signal and the LTE signal transmitted through the 13th and 14th bands in LTE.

Figure 9A:
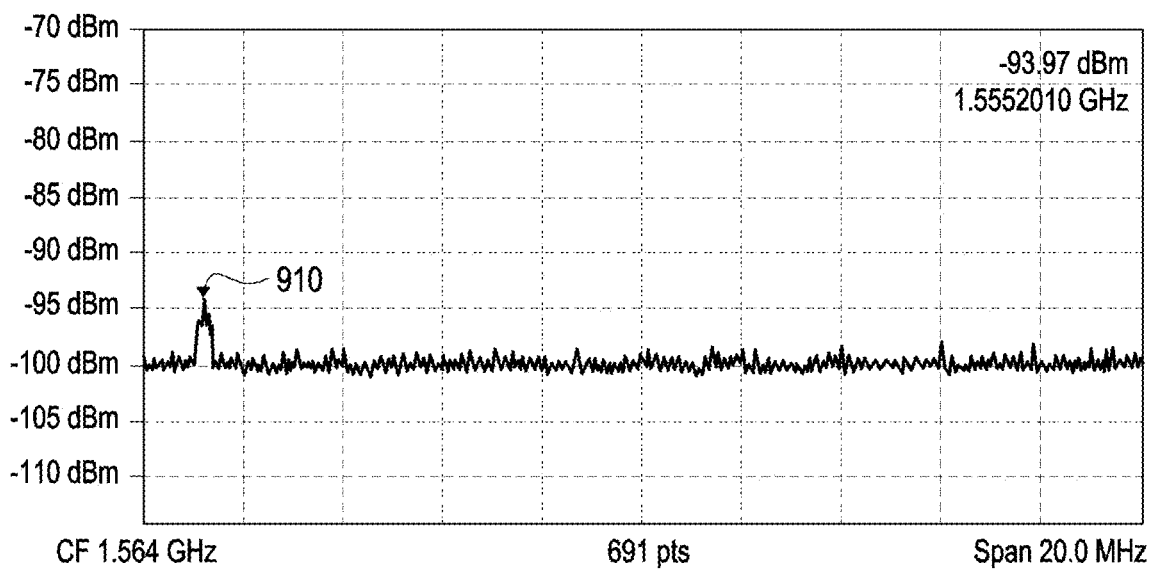
FIG. 9A illustrates a result showing the magnitude of a second harmonic frequency component of a signal transmitted before increasing the current supplied to a power amplifier, for example.
Figure 9B:
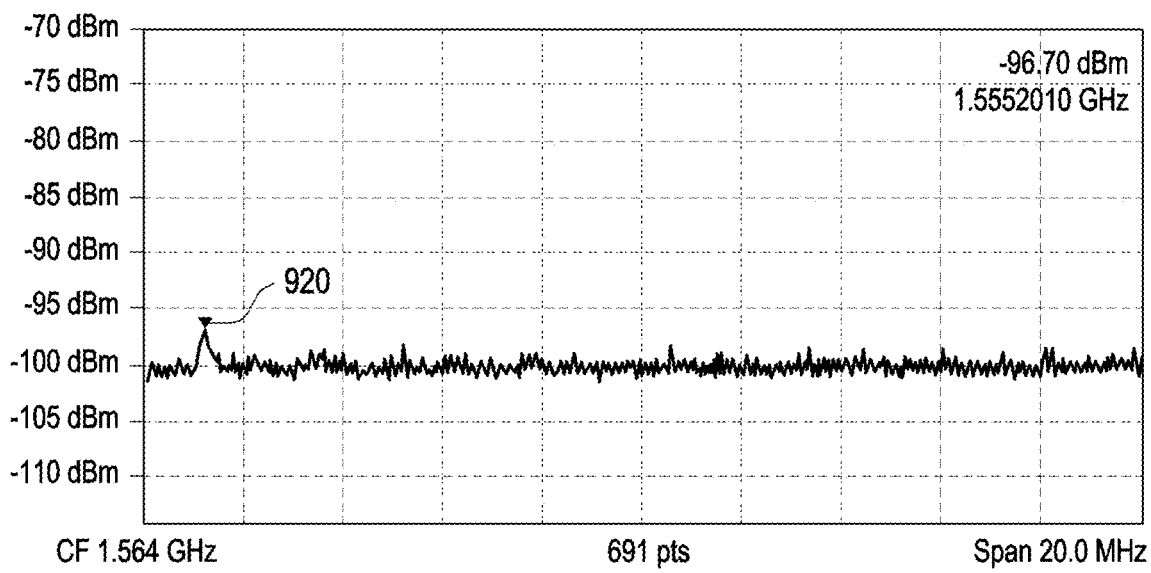
FIG. 9B illustrates a result showing the magnitude of a second harmonic frequency component of a signal transmitted in a state where the current supplied to the power amplifier is increased, for example.

FIG. 9A illustrates a result showing the magnitude of a second harmonic frequency component of a signal transmitted before increasing the current supplied to a power amplifier. FIG. 9B illustrates a result showing the magnitude of a second harmonic frequency component of a signal transmitted in a state where the current supplied to the power amplifier is increased.

As illustrated in FIGS. 9A and 9B, it may be identified that while the magnitude 910 of the second harmonic frequency component of the transmitted signal before increasing the current supplied to the power amplifier has −93.97 dBm, the bias voltage for the power amplifier is increased from 3.4V to 4.2V and the increased voltage is applied so as to increase and supply the current supplied to the power amplifier, so that the magnitude 920 of the second harmonic frequency component for the transmitted signal is enhanced to −96.70 dBm.

Figure 10A:
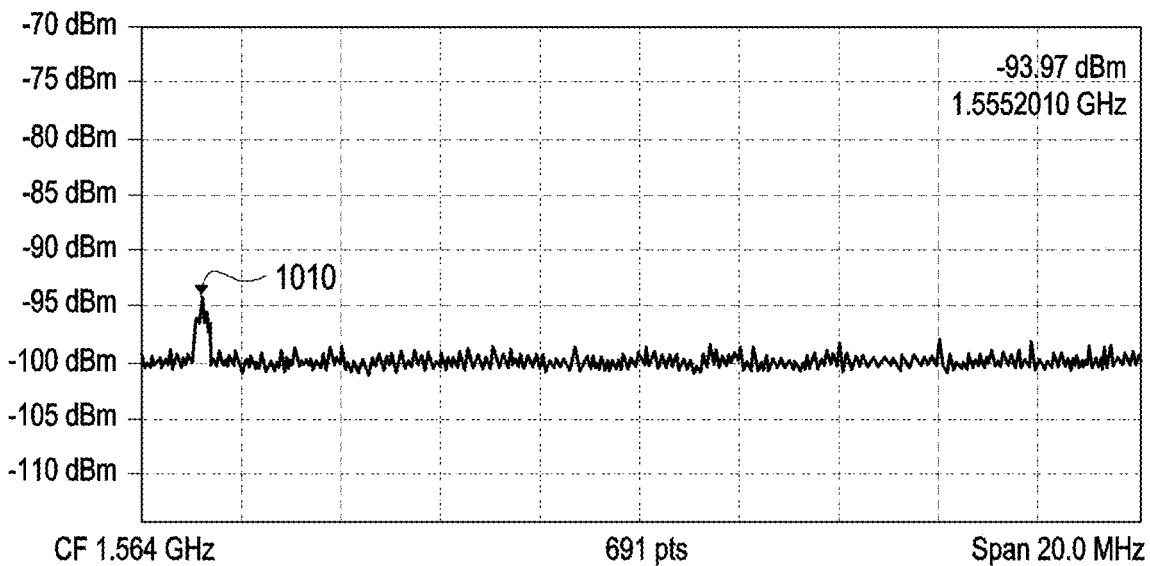
FIG. 10A illustrates a result showing the magnitude of a second harmonic frequency component for a signal before reducing the maximum power for transmitting a signal, for example.
Figure 10B:
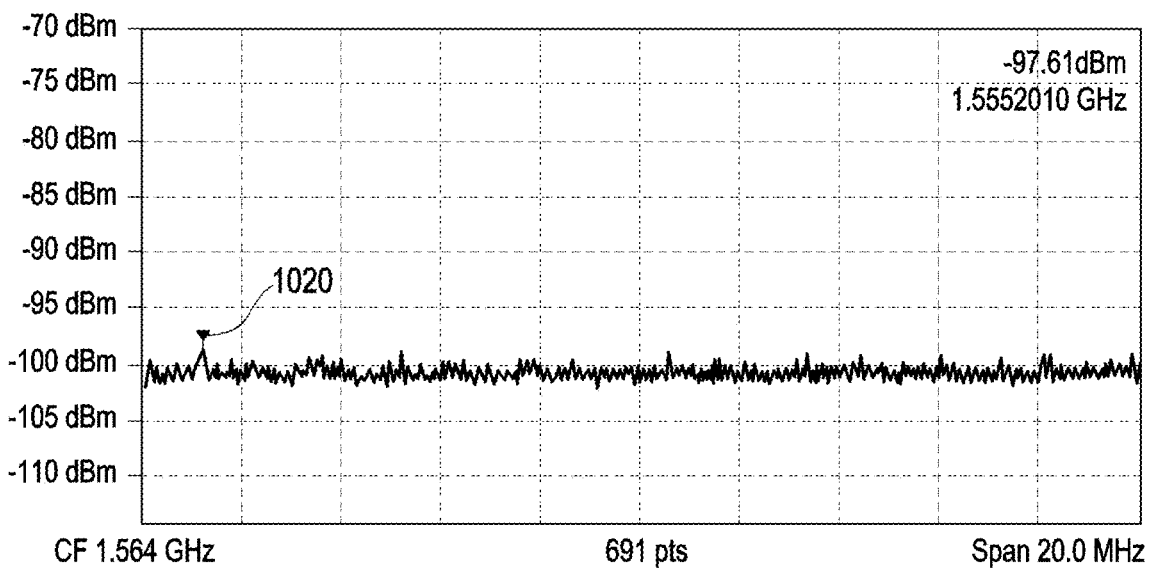
FIG. 10B illustrates a result for the magnitude of a second harmonic frequency component for a signal transmitted in a state where the maximum power for transmitting a signal is reduced, for example.

FIG. 10A illustrates a result showing the magnitude of a second harmonic frequency component for a signal before reducing the maximum power for transmitting a signal. FIG. 10B illustrates a result for the magnitude of a second harmonic frequency component for a signal transmitted in a state where the maximum power for transmitting a signal is reduced.

As illustrated in FIGS. 10A and 10B, it may be identified that while the magnitude 1010 of the second harmonic frequency component for the signal before reducing the maximum power has −93.97 dBm, the magnitude 1020 of the second harmonic frequency component for the transmitted signal, with the maximum power for signal transmission reduced, is enhanced to −97.61 dBm. As such, it may be identified that the magnitude of the second harmonic frequency component of the transmitted signal is reduced by about 3 dBm from −93.97 dBm to −97.61 dBm by reducing the maximum power from 25 dBm to 23 dBm.

Figure 11A:
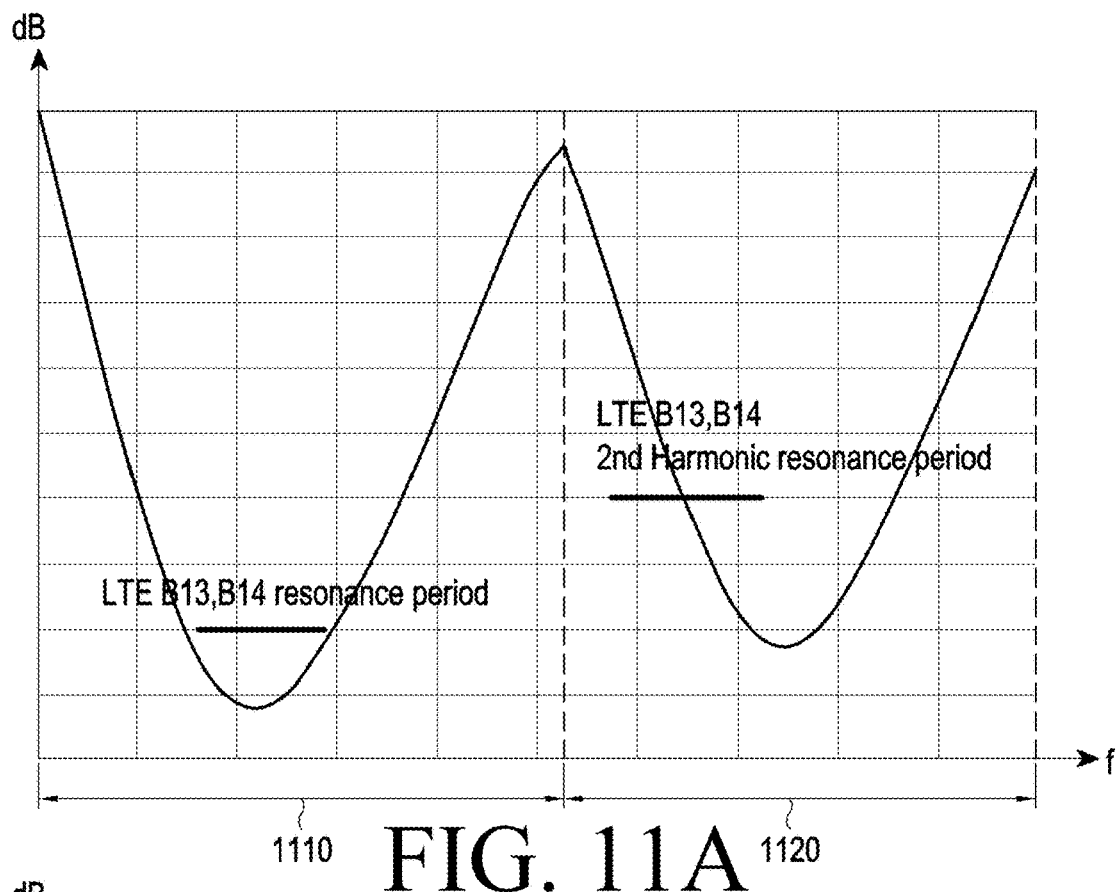
FIG. 11A illustrates a result showing characteristics before a first antenna switches to a functional element where no resonance occurs, for example.
Figure 11B:
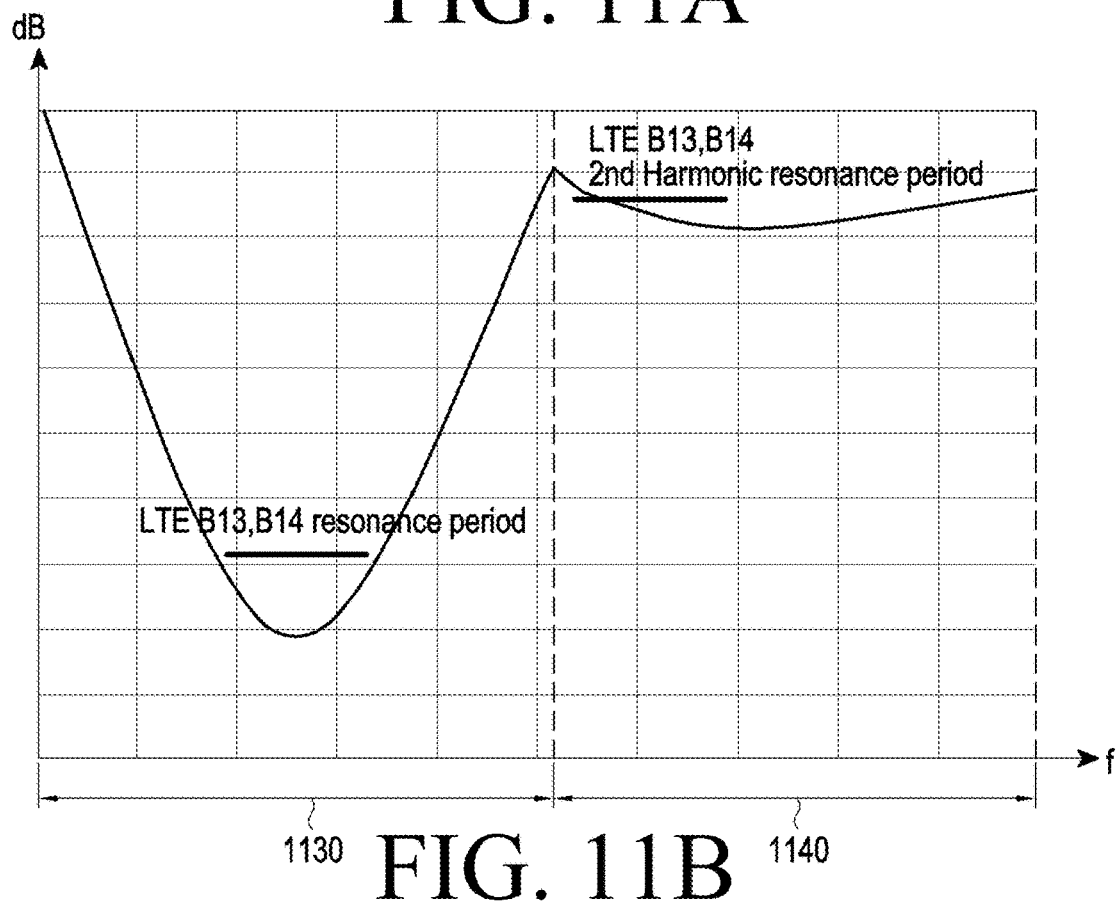
FIG. 11B illustrates a result showing characteristics in a state where a first antenna switches to a functional element where no resonance occurs, for example.

FIG. 11A illustrates a result showing characteristics before a first antenna switches to a functional element where no resonance occurs. FIG. 11B illustrates a result showing characteristics in a state where a first antenna switches to a functional element where no resonance occurs.

As illustrated in FIGS. 11A and 11B, it may be identified that since the reflected wave in the resonance period 1110 where a signal is transmitted in the 13th and 14th bands of LTE before the first antenna 330 switches into the functional element where no resonance occurs and the second harmonic resonance period 1120 is smaller than the reflected wave in the resonance period 1130 where a signal is transmitted after switching into the functional element and the second harmonic resonance period 1140, interference between the first antenna 330 and the second antenna 340 is avoided.

The invention claimed is:

1. An electronic device, comprising:
a first antenna and a second antenna;
a battery;
a wireless communication module having a coupler; and
a processor electrically connected with the first and second antennas, the battery, and the wireless communication module, wherein the processor is configured to:
measure a magnitude of a component corresponding to a designated frequency band of a coupling signal fed back from the coupler based on a first signal transmitted or received through the first antenna,
compare the measured magnitude with a designated threshold, and
control at least some elements of the electronic device to allow the measured magnitude to be reduced to the designated threshold or less if the measured magnitude exceeds the designated threshold,
wherein the processor is configured to perform at least one of increasing a current supplied to a power amplifier provided in the wireless communication module, reducing power for transmitting the first signal through the first antenna, or switching into a functional element where no resonance occurs with the second antenna to allow the measured magnitude to be reduced to the designated threshold or less, and
wherein the processor is configured to select the functional element where no resonance occurs with the second antenna in an antenna switching module including a plurality of functional elements.

2. The electronic device of claim 1, wherein the processor is configured to increase the current supplied to the power amplifier based on linearity for a signal to be amplified by the power amplifier and supply the increased current to the power amplifier.

3. The electronic device of claim 1, wherein the processor is configured to reduce first power supplied from the battery to second power to transmit the first signal through the first antenna to a communication network.

4. The electronic device of claim 1, wherein the magnitude of the component corresponding to the designated frequency band is an amplitude of a signal having a frequency obtained by multiplying a designated transmission or reception frequency by 2.

5. The electronic device of claim 1, wherein the first signal is a signal transmitted or received based on a 13th and 14th band of long term evolution (LTE), and a second signal transmitted or received through the second antenna is a global positioning system (GPS) signal.

6. The electronic device of claim 1, wherein the coupling signal includes any one of a forward coupling signal which results as a signal transmitted through the first antenna is fed back from the coupler or a reverse coupling signal which results as a signal received through the first antenna is fed back from the coupler.

7. The electronic device of claim 1, further comprising a band pass filter disposed between the processor and the coupler, wherein the band pass filter is configured to transmit a second harmonic frequency component of the coupling signal.

8. A method for identifying a component corresponding to a designated frequency band included in a transmission signal by an electronic device including a first antenna and a second antenna, the method comprising:
measuring a magnitude of a component corresponding to a designated frequency band of a coupling signal fed back from a coupler based on a first signal transmitted or received through the first antenna;
comparing the measured magnitude with a designated threshold; and
controlling at least some elements of the electronic device to allow the measured magnitude to be reduced to the designated threshold or less if the measured magnitude exceeds the designated threshold,
wherein controlling the at least some elements of the electronic device includes:
increasing a current supplied to a power amplifier amplifying the first signal;
reducing power for transmitting the first signal through the first antenna; or
switching to a functional element in which no resonance occurs with the second antenna, and wherein switching to the functional element in which no resonance occurs with the second antenna includes selecting the functional element where no resonance occurs with the second antenna in an antenna switching module including a plurality of functional elements.

9. The method of claim 8, wherein increasing the current supplied to the power amplifier amplifying the first signal includes:

increasing the current supplied to the power amplifier by a predetermined multiple based on linearity for a signal to be amplified by the power amplifier; and supplying the current increased by the predetermined multiple to the power amplifier.

10. The method of claim 8, wherein reducing the power for transmitting the first signal through the first antenna includes reducing first power to second power to transmit the first signal through the first antenna to a communication network.

11. The method of claim 8, wherein the magnitude of the component corresponding to the designated frequency band is an amplitude of a signal having a frequency obtained by multiplying a designated transmission or reception frequency by 2.

12. The method of claim 8, wherein the first signal is a signal transmitted or received based on a 13th and 14th band of long term evolution (LTE), and a second signal transmitted or received through the second antenna is a global positioning system (GPS) signal.

13. The method of claim 8, wherein the coupling signal includes any one of a forward coupling signal which results as a signal transmitted through the first antenna is fed back from the coupler or a reverse coupling signal which results as a signal received through the first antenna is fed back from the coupler.

14. A non-transitory computer readable storage medium storing a program including instructions to enable an electronic device including a first antenna and a second antenna to identify a component corresponding to a designated frequency band included in a transmission signal, the instructions executed to enable at least one processor to:

measure a magnitude of a component corresponding to a designated frequency band of a coupling signal fed back from a coupler based on a first signal transmitted or received through the first antenna;

compare the measured magnitude with a designated threshold; and control at least some elements of the electronic device to allow the measured magnitude to be reduced to the designated threshold or less if the measured magnitude exceeds the designated threshold, wherein the instructions enable the at least one processor to perform at least one of increasing a current supplied to a power amplifier amplifying the first signal, reducing power for transmitting the first signal through the first antenna, or switching into a functional element where no resonance occurs with the second antenna, and wherein the instructions enable the at least one processor to select the functional element where no resonance occurs with the second antenna in an antenna switching module including a plurality of functional elements.

15. The non-transitory computer readable storage medium of claim 14, wherein the first signal is a signal transmitted or received based on a 13th and 14th band of long term evolution (LTE), and a second signal transmitted or received through the second antenna is a global positioning system (GPS) signal.

* * * * *